United States Patent [19]

Neveux

[11] 4,150,263
[45] Apr. 17, 1979

[54] ROTATABLE DISTRIBUTOR

[75] Inventor: René E. Neveux, Les Clayes-sous-Bois, France

[73] Assignee: Societe Anonyme Francaise du Ferodo, Paris, France

[21] Appl. No.: 807,830

[22] Filed: Jun. 20, 1977

[30] Foreign Application Priority Data

Jun. 29, 1976 [FR] France .................. 76 19782

[51] Int. Cl.² .................. H01H 19/00; F16K 11/00
[52] U.S. Cl. .................. 200/11 R; 200/61.86; 200/291; 200/303; 137/625.11; 137/625.46
[58] Field of Search .............. 200/11 R, 11 D, 11 G, 200/11 J, 11 K, 61.86, 291, 306, 303, 110 A; 137/625, 625.11, 625.46

[56] References Cited
U.S. PATENT DOCUMENTS

| 2,834,842 | 5/1958 | Le Beau | 200/11 K |
| 3,336,457 | 8/1967 | Julian et al. | 200/306 |
| 3,571,534 | 3/1971 | Ashman | 200/11 D |
| 3,594,527 | 7/1971 | Brant et al. | 200/11 G X |
| 3,637,962 | 1/1972 | Fiddler et al. | 200/61.86 |
| 3,824,356 | 7/1974 | Fiddler et al. | 200/61.86 |
| 3,856,045 | 12/1974 | Kenny et al. | 200/61.86 X |
| 3,983,352 | 9/1976 | Ellis, Jr. et al. | 200/11 J |
| 4,038,504 | 7/1977 | McAnulty et al. | 200/11 G X |
| 4,049,020 | 9/1977 | Neveux | 137/625.11 |

Primary Examiner—James R. Scott
Attorney, Agent, or Firm—Carella, Bain, Gilfillan & Rhodes

[57] ABSTRACT

A rotatable distributor comprising a frame section and a plate section which is associated with a coupling having clip means which press the plate against the frame. The device further comprises an incrementing or indexing element and a rotational guiding surface for guiding the plate with respect to the frame.

7 Claims, 11 Drawing Figures

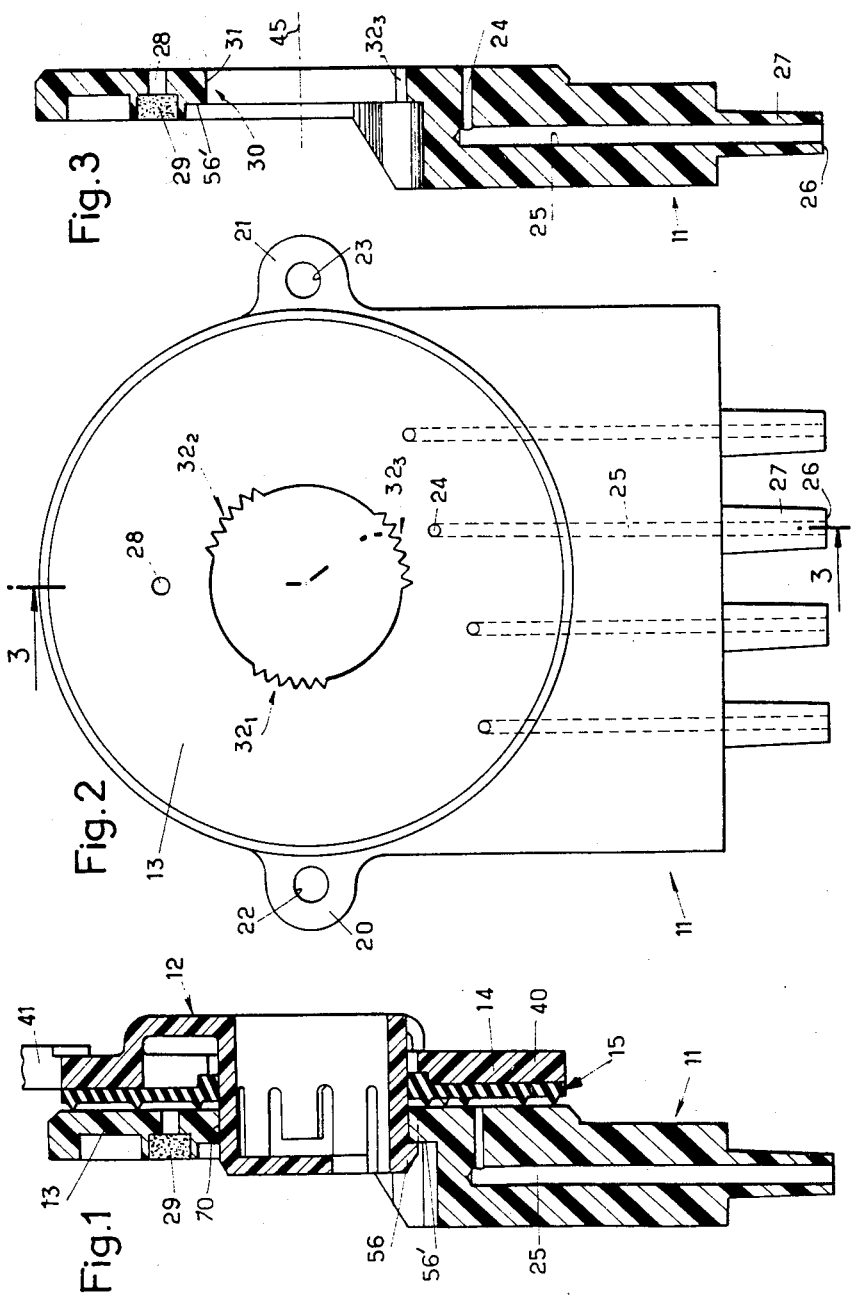

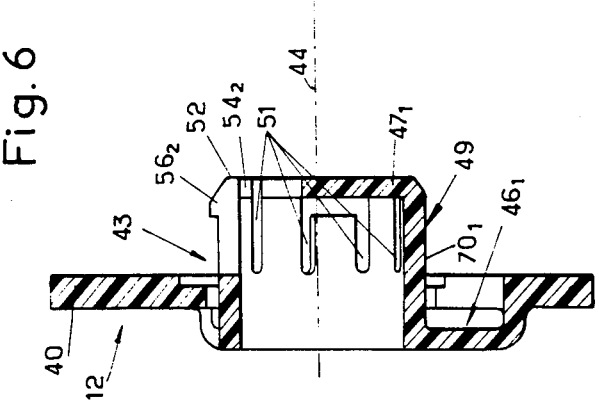
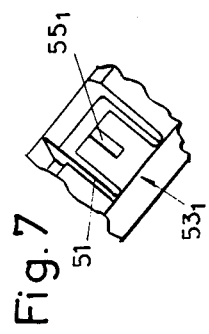
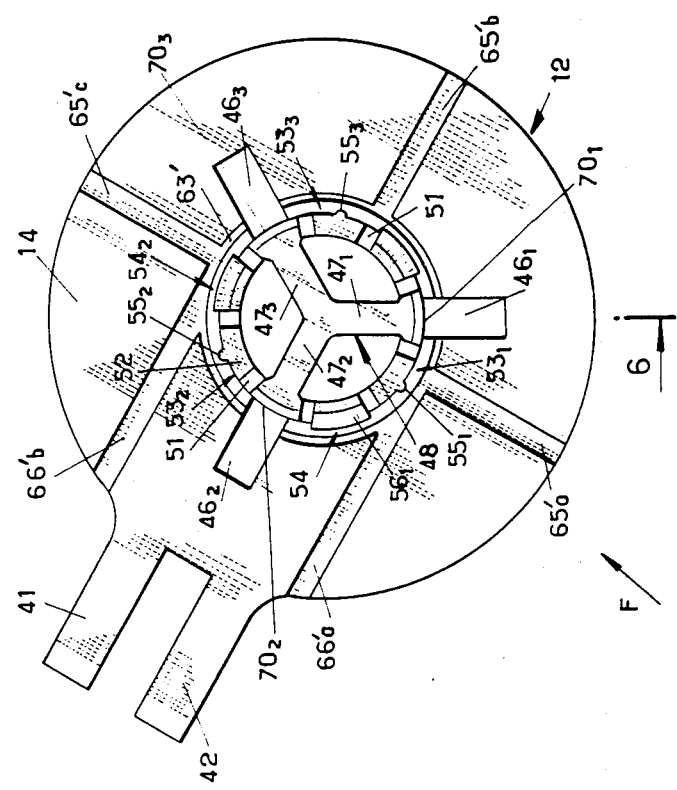

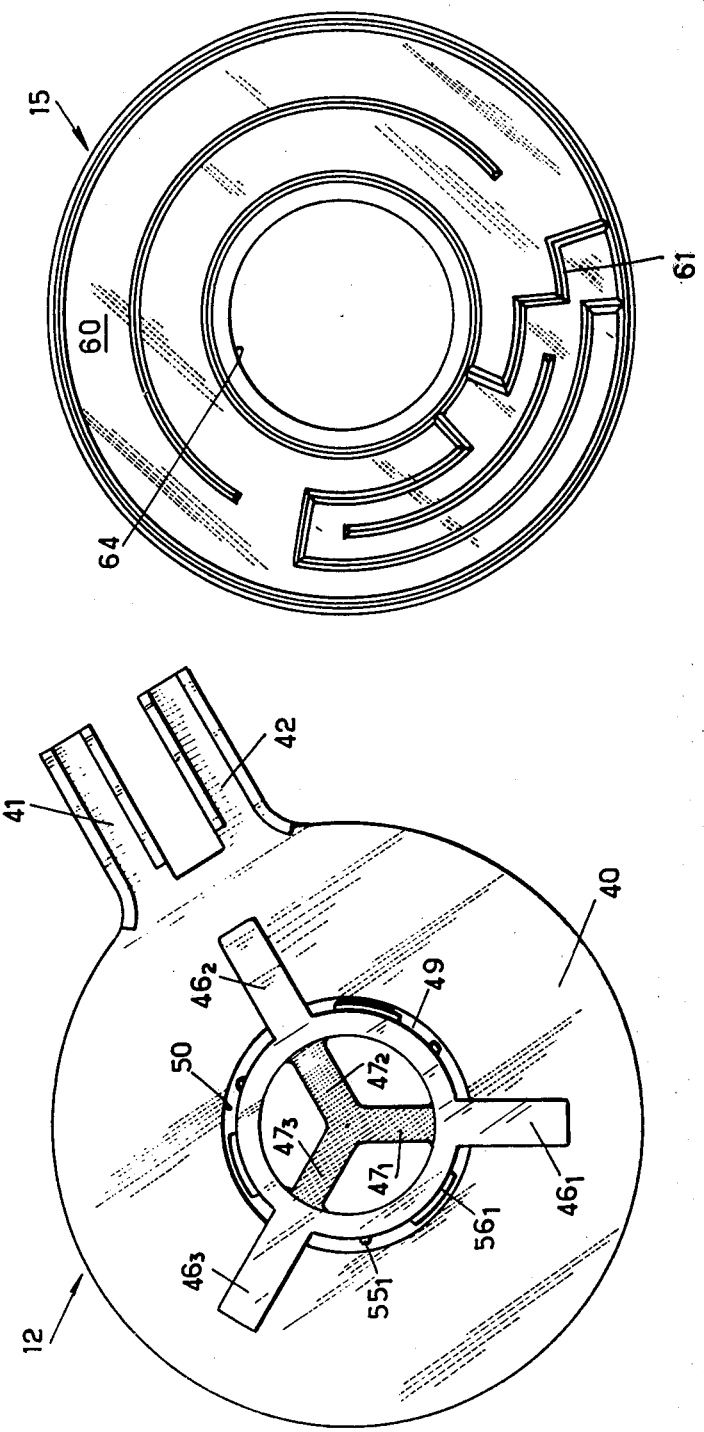

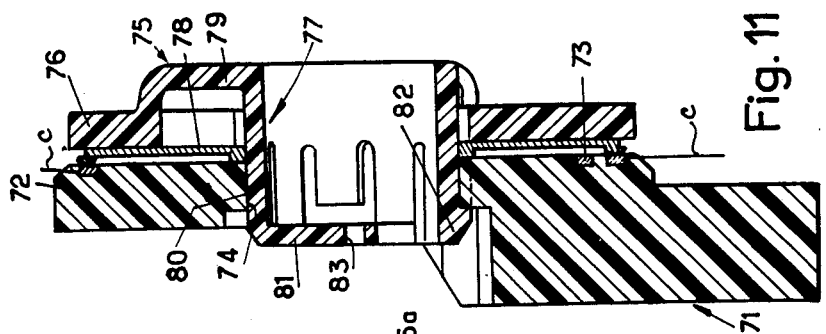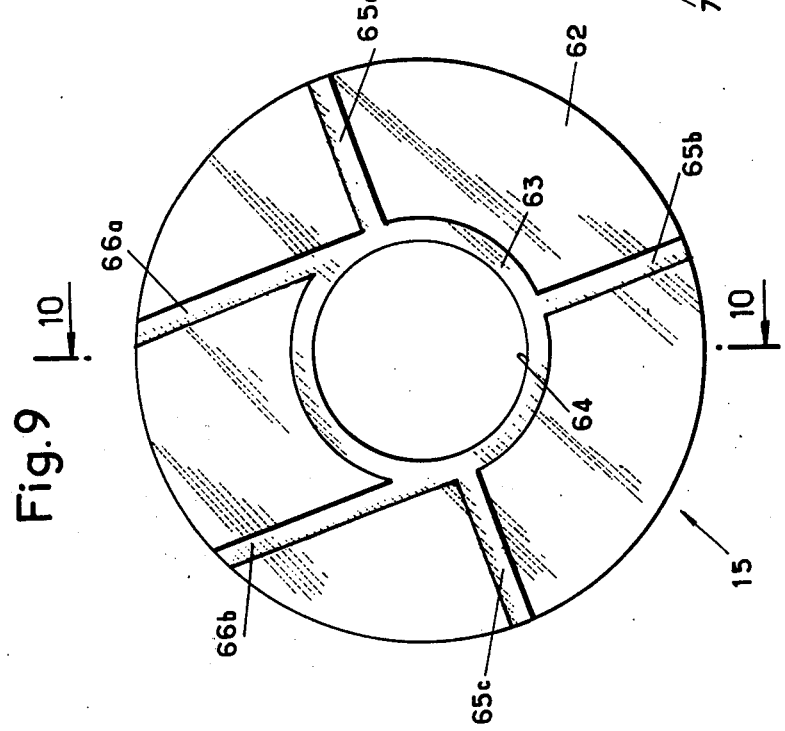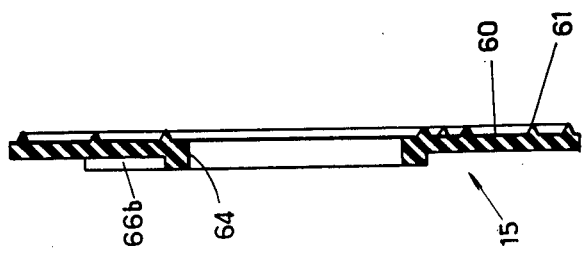

ROTATABLE DISTRIBUTOR

BACKGROUND OF THE INVENTION

1. Field of the Invention

The invention relates to improvements for rotatable distributors, especially to those of the "pie" type.

Such devices find use in numerous fields and they are used, especially, for the adjustment of temperature control equipment of vehicular automobiles.

2. Description of the Prior Art

French Pat. No. 2,257,137 discloses a rotatable electric switch having two plates pressed against one another by flexible "maintaining" elements which are attached to one of the plates and extend through a hole in the other plate. Such a switch however fails to disclose an indexing element permitting incremented rotation of one of the plates with respect to the other.

SUMMARY OF THE INVENTION

It is thus an object of the invention to provide devices comprising a body on which is rotatably mounted a plate which is connected to an element pressed against a frame, and in which incremental rotation of the plate selectively establishes and interrupts the fluid or electric circuits which are partially prearranged on the frame.

In the case of an electric device, the frame may have one or a plurality of electrically conducting paths which end in conductors and the element connected to the plate comprises one or a plurality of movable contacts.

In the case of a hydraulic or pneumatic distributor, the frame is pierced by holes adapted to be placed selectively into communication between themselves by the fluid paths defined by a design of projections in a "labyrinth" on the rotatable element constituted, for example, by a membrane of an elastomeric type of material.

For satisfactory operation of the devices it is important to assure on the one hand, the independence of the circuits, defined by the rotatable elements with respect to each other, and on the other hand the precise positioning of the plate with respect to the frame of the distributor. In certain known pneumatic devices the first condition is satisfied by a spring which presses the plate against the frame such that the sealing of the circuits with respect to one another is assured, while means such as teeth or indentations which cooperate between themselves and which are arranged on the frame and the plate permit satisfaction of the second condition. However, in such devices the assembly of the device is complicated because of the spring and because of the number of pieces which must be carefully assembled.

It is, in a general fashion, an aim of the invention to provide improvements of these distributors which facilitate their fabrication, particularly by reducing the number of parts to be assembled.

A rotatable distributor according to the invention comprises, a frame, a plate rotatably mounted on the said frame which is in contact with an element which is pressed against the frame to selectively establish and interrupt the fluid or electric circuits partially located on the frame when the plate is displaced by an incremented amount of rotation with respect to the frame. The distributor is characterized in that the plate comprises an axial clutch fitted with clip means for pressing the said element against the frame, at least one incrementing or indexing element and one rotational guiding surface for the plate with respect to the frame.

In one embodiment, the plate and the coupling combined with it are molded into a single piece which is advantageously made out of plastic material. The combination is further provided with at least one finger or other manipulation element.

BRIEF DESCRIPTION OF THE DRAWINGS

The invention will be well understood by the description which follows, done by way of example, and with reference to the attached drawings in which:

FIG. 1 is cross-sectional view of a distributor of the invention;

FIG. 2 is an elevational view of the frame of the distributor according to the invention;

FIG. 3 is a cross-sectional view of the frame of FIG. 2, along the line 3—3 of FIG. 2;

FIG. 4 is a planar view, along one of its faces, of a distributor plate according to the invention;

FIG. 5 is a view of the other side of the plate;

FIG. 6 is a cross-sectional view along the line 6—6 of FIG. 4;

FIG. 7 is a partial view of the plate following the direction of arrow F of FIG. 4;

FIG. 8 is a view, of a face, of a distributor membrane;

FIG. 9 is a view of the other face of the membrane;

FIG. 10 is a cross-sectional view along line 10—10 of FIG. 9;

FIG. 11 is a view analogous to that of FIG. 1 but for another embodiment.

DETAILED DESCRIPTION OF THE INVENTION

Reference is first made to FIG. 1 which shows the general configuration of a rotatable distributor according to the invention for a pneumatic embodiment. The distributor comprises a frame 11, a plate 12 rotatably mounted in the frame 11, and a membrane 15 made out of a material of the elastomeric type, which is interposed between an annular section 13 of the frame and an annular section 14 of the plate. The membrane which may for example be made of rubber is arranged so that it rotates with the plate.

The frame 11 of the distributor, as shown in FIGS. 2 and 3, is advantageously a block of plastic material with ears 20 and 21 which are pierced with holes 22 and 23.

Orifices which open onto the surface of plate 13 are each constituted by a borehole 24 perpendicular to the section 13 which ends in a one-eyed hole 25 which opens onto the end outer surface of a tip 27. In the embodiment described, the distributor comprises four such tips. One of the tips may be connected to a source of reduced pressure while the others are adapted to be connected to diverse devices, such as, for example, reduced pressure jacks for the adjustment of the control elements of flaps, spigots and check values or the like, of a temperature control installation of an automobile vehicle. When used as such, a hole 28 further opens onto the section 13 leading to the atmosphere. When the device is operated by a source of reduced pressure coming from the intake tube of a motor vehicle it comprises a filter 29 at its end spaced from the opening onto the section 13. The filter is made out of a foamed material or the like. The center of the section 13 is pierced by a circular transversal hole 30, having a longitudinal axis 45, whose cylindrical surface 31 is provided with three toothed zones $32_1$, $32_2$ and $32_3$. The toothed zones are evenly angularly spaced from one another; each zone occupying approximately 40° of the circle.

The hole 30 is adapted for guiding and rotationally indexing the plate 12 for incremental rotation. The plate, as shown in FIGS. 4 to 7, is constituted by a disc 40 made out of plastic material. The disc is provided with fingers 41 and 42, which serve to manoevre the disc, and with a coupling 43 of axis 44 which when the plate is mounted on the frame 11, is aligned with the axis 45. The coupling 43 is advantageously molded into a single piece with the disc 40 and is connected to it by bridging elements $46_1$, $46_2$, and $46_3$ which are radially disposed at 120° with respect to one another around the axis 44. Branches $47_1$, $47_2$ and $47_3$ extend in a star in the same radial planes as the bridge elements 46, but on the other transverse face of the coupling These branches are molded into a single piece with the coupling. The diameter of the external lateral surface 49 of the coupling is slightly less than that of surface 50 running along the interior of the disc 40 to which the coupling is thus connected in a "suspended" fashion.

According to the invention, the coupling possesses a certain capacity of diametrical deformation by virtue of the notches 51 which are longitudinally arranged over approximately half of its length and which open at 52 which is within the plane in which the star 48 extends. The notches 51 are evenly angularly distributed around the axis 44 and of a number such that they define two flaps $53_1$ and $54_1$ between the branches $47_1$ and $47_2$, two analogous flaps $53_2$ and $54_2$ between the branches $47_2$ and $47_3$, and two like flaps $53_3$ and $54_3$ between the branches $47_3$ and $47_1$. The flaps $53_1$, $53_2$ and $53_3$, each have along their outer surface, which corresponds to that of the coupling relief beads $55_1$, $55_2$ and $55_3$ respectively which are adapted to cooperate with the toothed zones 32 of frame 11 as will be shown hereafter. Flaps 54, as is clearly shown in FIG. 6, have ends which are in the shape of protrusions 56 adapted to cooperate with a circular track 56' forming the hole 30 on the face of the frame 11 which is parallel and opposite to that of the section 13.

The cooperation of the protrusions 56 and of the track associated with them on the frame 11 maintains the membrane 15 pressed against the section 13. Membrane 15, as shown in FIGS. 8 to 10, has a design of projections or "labyrinth" 61 on its face 60 in contact with the section 13 (FIG. 8). On its other face, 62, it has an arrangement of ribs in which: 63 is circular and surrounds the central opening 64 of the membrane; ribs such as 65a, 65b and 65c, which are radial; and ribs 66a and 66b which are directed parallel to rib 65b, as well as 65a and 65c, but are tangential to rib 63.

An analogous design of grooves 63', 65'a, 65'b, 65'c, 66'a and 66'b on one side of the disc 40 corresponds to the design of ribs (FIG. 4) such that the membrane 15 rotates together with the plate 12 when it is rotated.

Moreover, by virtue of the movement of the membrane by the plate, the presence of two parallel ribs of the membrane and grooves corresponding to the plate, facilitate the assembly of the device; the relative position of the membrane with respect to the plate being fixed without ambiguity.

Sections $70_1$, $70_2$ and $70_3$ of the wall of the coupling connect the bridging sections to the branches 47 of the star 48 thus assuring the guidance during rotation of the plate with respect to the frame 11, while the protrusions 56 force and thus seal the membrane 15 against the section 13.

The rotational indexing, i.e., the precise determination of the preestablished angular positions of the plate with respect to the frame for selectively establishing and interrupting of the pneumatic circuits by means of tracks which define the projections 61 of the membrane 15, is assured by cooperation between the beads 55 and the toothed zones 32.

The fabrication and the assembly of the distributor of the invention are considerably simplified with respect to the fabrication and assembly of known devices. There are a fewer number of parts: the plate and the coupling can, in particular, be made by molding the parts into a single piece. Also, the structure of the device allows it to perform in ways which, in the known devices, were performed by a plurality of parts.

Assembly by a ratchet mechanism, which takes advantage of the deformation properties of the coupling, is both simple and sure.

It should be well understood that the invention is not limited to the embodiment described and represented.

Thus, when it is to be used in certain applications, whether or not they have to do with control of automobile vehicle equipment, the plate 12 can have its periphery in the shape of a cam so as, for example, to activate electric or pneumatic contacts.

By so doing, a multiplicity of functions can be controlled by simply aligning the fingers 41 and 42 of the plate 12 with a mark corresponding to an increment.

Likewise, if desired the amplitude of rotation of the plate 12 can be limited, by lugs, so as to avoid the establishment of pneumatic circuits which may impair the functioning of the apparatus outfitted with the distributor, or the distributor itself.

The rotation of the plate must, in certain applications, be controlled by a rotatable shaft whose axis is aligned with that of the device. In such cases, the center of the star 48 has a square bore, or a circular bore which has flat areas, into which the end of the control shaft is fitted.

Alternatively, an axial casing connected to the star 48, on either the outside or inside of the coupling, having a longitudinal borehole, can be provided which can then be connected to the end of a control shaft.

In the embodiment shown in FIG. 11, the rotatable distributor is of the electrical type. It comprises a frame 71 whose section 72 has guides of metal or of a conductive alloy. The section 72 is tapped by a central hole 74 which has teeth sections analogous to teeth sections 32 of frame 11 in the preceding embodiment. A plate 75 having a structure similar to that of plate 12 in the preceding embodiment, in particular with respect to the existence of a disc 76 and a coupling 77, cooperates with the frame 71. The disc 76 has one or a plurality of contacts 78 which are adapted to cooperate with the guides 73 to which are connected conductors C. The clutch is connected to the disc 76 by the bridging sections 79. The protrusions 82, at the end of elastically deformable flaps, and sections 80 connecting the guards 79 to the branches 81, for guidance during rotation of the plate with respect to the frame, correspond respectively to protrusions 56 and sections 70 of the preceding embodiment. To rotate of the plate 75 in a manner which is incremented by cooperation between the teeth of the frame with the indentations on the deformable elastic flaps of the coupling, the central zone common to each of the branches 81 is pierced by an orifice 83 in which is fitted the end of a control shaft, not shown.

The drawing and specification present a detailed disclosure of preferred embodiments of the invention, yet it is to be understood that the invention is not limited to the specific embodiments disclosed, but covers all modifications changes and alternative constructions falling within the scope of the invention as defined by the claims.

I claim:

1. In a rotatable distributor device having a frame and a plate rotatably associated with the frame through a coupling, said device for establishing and interrupting circuits upon incremental rotation of said plate relative to said frame, said circuit being partially prearranged on said frame and partially prearranged on said plate, said circuits being variable in accordance with the relative position of said plate to said frame, the improvement comprising:

said coupling and said plate being integrally formed out of a single piece of molded plastic material;

said frame having an aperture for providing a guide surface for guiding rotation of said coupling relative to said frame;

teeth arranged peripherally about said aperture;

said frame having an inner circular track;

said coupling being of generally tubular form having flaps extending in an axial direction, said flaps elastically deformable in the radial direction and delimited by slits which extend along a part of the length of said coupling, predetermined ones of said flaps having projections at their ends for matable engagement with said inner circular track for pressing said plate against said frame, and predetermined other ones of said flaps provided with beads for matable engagement with said teeth of said aperture for enabling said plate to incrementally rotate into predetermined positions relative to said frame.

2. A rotatable distributor device according to claim 1 wherein said plate comprises an annular disc coaxial with said coupling, and wherein said coupling is directly attached to said disc by means of a plurality of bridging sections attached to a first end of said coupling.

3. A rotatable distributor device according to claim 2 wherein at each bridging section, in the same radial plane, are provided (1) a rigid axial flap of said coupling, the outer surface of which is a guide surface of said coupling in said aperture of said frame, and (2) a rigid radial branch at the second end of said coupling, said radial planes being equiangularly distributed around the axis of said coupling.

4. A rotatable distributor device according to claim 1 for establishing and interrupting fluid circuits and further comprising an elastometric membrane mounted on the face of said plate facing an outer face of said frame, said membrane provided with predetermined projections forming a labyrinth on the side of said membrane adjacent said outer face of said frame, and wherein said frame includes a plurality of orifices forming parts of said circuits, said orifices opening on said outer face of said frame and for cooperating with said labyrinth for establishing and interrupting said fluid circuits.

5. A rotatable distributor device according to claim 4 wherein said elastometric membrane is provided with grooves or ribs on the side thereof which is applied against said plate, complementary ribs or grooves being provided on said plate for causing said membrane to rotate together with said plate, at least two of said grooves or ribs being radial and perpendicular to each other and arranged for fixing the transverse position of said membrane with respect to said plate.

6. A rotatable distributor device according to claim 4, wherein one of said orifices is for connection to a source of reduced pressure and all other orifices are for connection with elements operating at reduced pressure, said frame having a supplemental orifice open to the atmosphere, said supplemental orifice being covered by a foamed filter material.

7. A rotatable distributor device according to claim 1 for establishing and interrupting electric circuits wherein the face of said frame adjacent said plate is provided with electrically conductive tracks substantially circularly arranged about said aperture, and said plate provided with at least one electrical contact for cooperation with said tracks for establishing and interrupting electrical circuits upon rotation of said plate relative to said frame.

* * * * *